(12) United States Patent
Yoshinari et al.

(10) Patent No.: US 8,497,052 B2
(45) Date of Patent: Jul. 30, 2013

(54) METHOD FOR DETERMINING RECORDING EXPOSURE FOR HOLOGRAPHIC RECORDING MEDIUM AND METHOD FOR RECORDING THEREON

(75) Inventors: Jiro Yoshinari, Tokyo (JP); Naoki Hayashida, Tokyo (JP); Shohei Fujii, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/412,323

(22) Filed: Mar. 5, 2012

(65) Prior Publication Data

US 2012/0256334 A1 Oct. 11, 2012

(30) Foreign Application Priority Data

Apr. 7, 2011 (JP) ................. 2011-085797

(51) Int. Cl.
*G03H 1/00* (2006.01)
*G03H 1/26* (2006.01)
(52) U.S. Cl.
USPC ......... 430/1; 430/2; 430/394; 359/22; 359/24
(58) Field of Classification Search
None
See application file for complete search history.

(56) References Cited

U.S. PATENT DOCUMENTS

| | | | | |
|---|---|---|---|---|
| 3,725,071 A | * | 4/1973 | Seelbinder et al. | 430/30 |
| 3,814,504 A | * | 6/1974 | Brady et al. | 359/627 |
| 7,262,892 B1 | * | 8/2007 | Yasuda et al. | 359/29 |
| 2005/0059543 A1 | * | 3/2005 | Kolb et al. | 502/168 |
| 2006/0281021 A1 | * | 12/2006 | Riley et al. | 430/269 |
| 2007/0140090 A1 | * | 6/2007 | Yamakage et al. | 369/103 |
| 2007/0146846 A1 | * | 6/2007 | Yasuda et al. | 359/29 |
| 2008/0008076 A1 | * | 1/2008 | Raguin et al. | 369/103 |
| 2008/0231923 A1 | * | 9/2008 | Kanaoka et al. | 359/10 |
| 2012/0250123 A1 | * | 10/2012 | Hayashida et al. | 359/22 |

FOREIGN PATENT DOCUMENTS

| | | | |
|---|---|---|---|
| EP | 2028655 | * | 2/2009 |
| JP | A-03-249686 | | 11/1991 |
| JP | 04-145341 | * | 5/1992 |
| JP | B2-3058929 | | 7/2000 |

OTHER PUBLICATIONS

Pu et al., Exposure schedule for multiplexing holograms in photopolymer films., Opt. Eng., 35(10) 2824-2829 (Oct. 1996).*
Ortuno et al., Linear response deviations in photopolymers, Proc. SPIE 7358, 735815-1 to 735815-11 (2009).*

(Continued)

*Primary Examiner* — Martin Angebranndt
(74) *Attorney, Agent, or Firm* — Oliff & Berridge, PLC (57) ABSTRACT

An optimal recording exposure is determined by varying in the first to nth stages the recording exposure with a write laser beam to record a bright pattern image and a dark pattern image in each stage as the first to nth bright pattern images and the first to nth dark pattern images, respectively; irradiating the respective pattern images with a read beam to detect the intensity of a diffracted beam from the central portion of each image of the bright and dark patterns; calculating $Sa_1/Sb_1=SNR_1, \ldots,$ and $Sa_n/Sb_n=SNR_n$, where $Sa_1$ to $Sa_n$ are the intensity of a diffracted beam from the first to nth bright pattern images and $Sb_1$ to $Sb_n$, are the intensity of s diffracted beam from the first to nth dark pattern images; and determining a recording exposure which is given at the $SNR_{max}$ being the maximum value of the resulting $SNR_1$ to $SNR_n$.

10 Claims, 10 Drawing Sheets

OTHER PUBLICATIONS

Wan et al., "Coherent scattering noise properties of a blue laser sensitized holographic photopolymer mate3rial." Proc. SPIE vol. 6827, 682711-1 to 682711-7 (2007).*

Gu et al., "Volume holographic storage in photorefractive media", Proc. SPIE vol. 1812 pp. 97-102 (1992).*

Hsu et al., "Experimental characterization of phenanthrenequinone-doped poly(methyl methacrylate) photopolymer for volume holographic storage", Opt. Eng., vol. 42(5) pp. 1390-1396 (May 2003).*

* cited by examiner

| | | | |
|---|---|---|---|
| | ⬛⚪ | ⬜⚫ | |
| Area Ratio | 0.20 | 0.20 | |
| | Detected Intensity | | SNR (Sai/Sbi) |
| | Sai | Sbi | |
| Amount of Exposure (mJ/cm$^2$) 10 | 85 | 12 | 7 |
| 20 | 140 | 12 | 12 |
| 40 | 160 | 13 | 12 |
| 60 | 175 | 13 | 13 |
| 80 | 195 | 14 | 14 |
| 100 | 200 | 16 | 13 |
| 120 | 205 | 18 | 11 |

Fig. 8

| | | | |
|---|---|---|---|
| Area Ratio | 1 | 1 | |
| | Detected Intensity | | SNR (Sai/Sbi) |
| | Sai | Sbi | |
| Amount of Exposure (mJ/cm$^2$) 10 | 100 | 8 | 13 |
| 20 | 160 | 9 | 18 |
| 40 | 185 | 9 | 21 |
| 60 | 200 | 10 | 20 |
| 80 | 215 | 10 | 22 |
| 100 | 225 | 11 | 20 |
| 120 | 230 | 11 | 21 |

METHOD FOR DETERMINING RECORDING EXPOSURE FOR HOLOGRAPHIC RECORDING MEDIUM AND METHOD FOR RECORDING THEREON

TECHNICAL FIELD

The present invention relates to a method for determining a recording exposure to record a plurality of dot-shaped elemental holograms when forming the elemental holograms on a surface of a holographic recording medium to create a hard copy of a three-dimensional image. The invention also relates to a method for recording a stereoscopic image with the resulting recording exposure.

BACKGROUND ART

A holographic stereoscopic hard copy which can be used as a hard copy of a three-dimensional object, and a method and an apparatus for creating the same are disclosed in Patent Literature 1. The holographic stereoscopic hard copy is constructed by forming a plurality of dot-shaped elemental holograms on a surface of a medium.

In the aforementioned recording method, an original image pattern associated with each point on a holographic recording medium is displayed from three-dimensional image data on display means, and then a dot-shaped elemental hologram is formed on the aforementioned holographic recording medium corresponding to the displayed original image pattern.

As can be seen from this example, to form a three-dimensional image using an elemental hologram, it is necessary to find an optimal recording condition for recording the elemental hologram.

More specifically, it was required to determine an optimal recording condition for a certain holographic recording medium by varying the intensity of an object beam and a reference beam, the intensity ratio between the object beam and the reference beam, and the exposure time.

In contrast to this, for example, a method and a system for evaluating a holographic optical element is disclosed in Patent Literature 2, but cannot be used to quantitatively determine recording conditions. Accordingly, sample images with elemental holograms recorded under a variety of conditions have to be visually observed under white light in order to determine the optimal recording condition. This raises the problem that an enormous number of samples for determining the optimal recording condition and an enormous amount of time for visually observing the samples are required.

CITATION LIST

Patent Literature

Patent Literature 1: Japanese Patent Application Laid-Open No. Hei. 3-249686
Patent Literature 2: Japanese Patent No. 3058929

SUMMARY OF INVENTION

Technical Problem

The present invention has an object of providing a method for determining a recording exposure on a holographic recording medium and a recording method using the same, the method enabling the optimal recording condition for recording a stereoscopic image with elemental holograms to be qualitatively determined in a short time.

In summary, the above-described objectives are achieved by the following embodiments of the present invention.

(1) A method for determining a recording exposure to record a plurality of elemental holograms when forming the elemental holograms on a holographic recording medium to create a three-dimensional image, the method comprising: a bright pattern image recording step including a first bright pattern image recording substep of continuously recording a plurality of elemental holograms with a first stage recording exposure to record a first bright pattern image which is brighter at a central portion than at a peripheral portion, and second to nth bright pattern image recording substeps of recording second to nth bright pattern images having the same pattern as that of the first bright pattern image with a recording exposure varied in second to nth stages; a dark pattern image recording step including a first dark pattern image recording substep of continuously recording a plurality of elemental holograms with the same recording exposure as that for the first stage in the first bright pattern image recording substep to record a first dark pattern image, the first dark pattern image having a central portion darker than a peripheral portion and having reversed bright and dark portions with respect to the first bright pattern image, and second to nth dark pattern image recording substeps of recording second to nth dark pattern images with the same recording exposure as that for the second to nth stages, the second to nth dark pattern images having the same pattern as that of the first dark pattern image; a step of irradiating the first to nth bright pattern images and the first to nth dark pattern images with a read beam to detect an intensity of a diffracted beam occurring from each image; an SNR calculating step of calculating $Sa_1/Sb_1=SNR_1$, $Sa_2/Sb_2=SNR_2$, ..., and $Sa_n/Sb_n=SNR_n$, where $Sa_1$ to $Sa_n$ are an intensity of a diffracted beam from the first to nth bright pattern images and $Sb_1$ to $Sb_n$ are an intensity of a diffracted beam from the first to nth dark pattern images; an $SNR_{max}$ determining step of determining an $SNR_{max}$ being the maximum of the resulting $SNR_1$, $SNR_2$, ..., and $SNR_n$; and a step of determining a recording exposure at the $SNR_{max}$ as an optimal recording exposure among the recording exposures in the first to nth stages.

(2) The method for determining a recording exposure for a holographic recording medium according to (1), wherein an image area in the central portion in the first to nth bright pattern images and the first to nth dark pattern images is 0.01 to 0.5 times an entire pattern area.

(3) The method for determining a recording exposure for a holographic recording medium according to (1), wherein a trial writing area is set on the holographic recording medium in addition to an image area for recording images so as to record the first to nth bright pattern images and the first to nth dark pattern images on the trial writing area.

(4) The method for determining a recording exposure for a holographic recording medium according to (1), wherein the holographic recording medium is a three-color image recording medium, the colors including red, green, and blue, and the bright pattern image recording step and the dark pattern image recording step include a substep of recording a red bright pattern image and a substep of recording a red dark pattern image using a red write laser beam; a substep of recording a green color bright pattern image and a substep of recording a green color dark pattern image using a green write laser beam; and a substep of recording a blue dark pattern image and a substep of recording a blue bright pattern image using a blue write laser beam, and a recording exposure is determined for each of the colors, i.e., red, green, and blue.

(5) The method for determining a recording exposure for a holographic recording medium according to (1), wherein a dark portion and a bright portion of the bright pattern image and the dark pattern image are formed from an entirely dark pixel and an entirely bright pixel of a spatial light modulator, respectively.

(6) A method for recording on a holographic recording medium wherein a write laser beam with an optimal recording exposure is used to record a stereoscopic image on a holographic recording medium, the optimal recording exposure being determined according to either one of (1) to (5).

Advantageous Effects of Invention

The present invention has an effect of enabling a condition for recording good images at a high SNR to be determined qualitatively in a short time.

DESCRIPTION OF EMBODIMENTS

Figure 1:
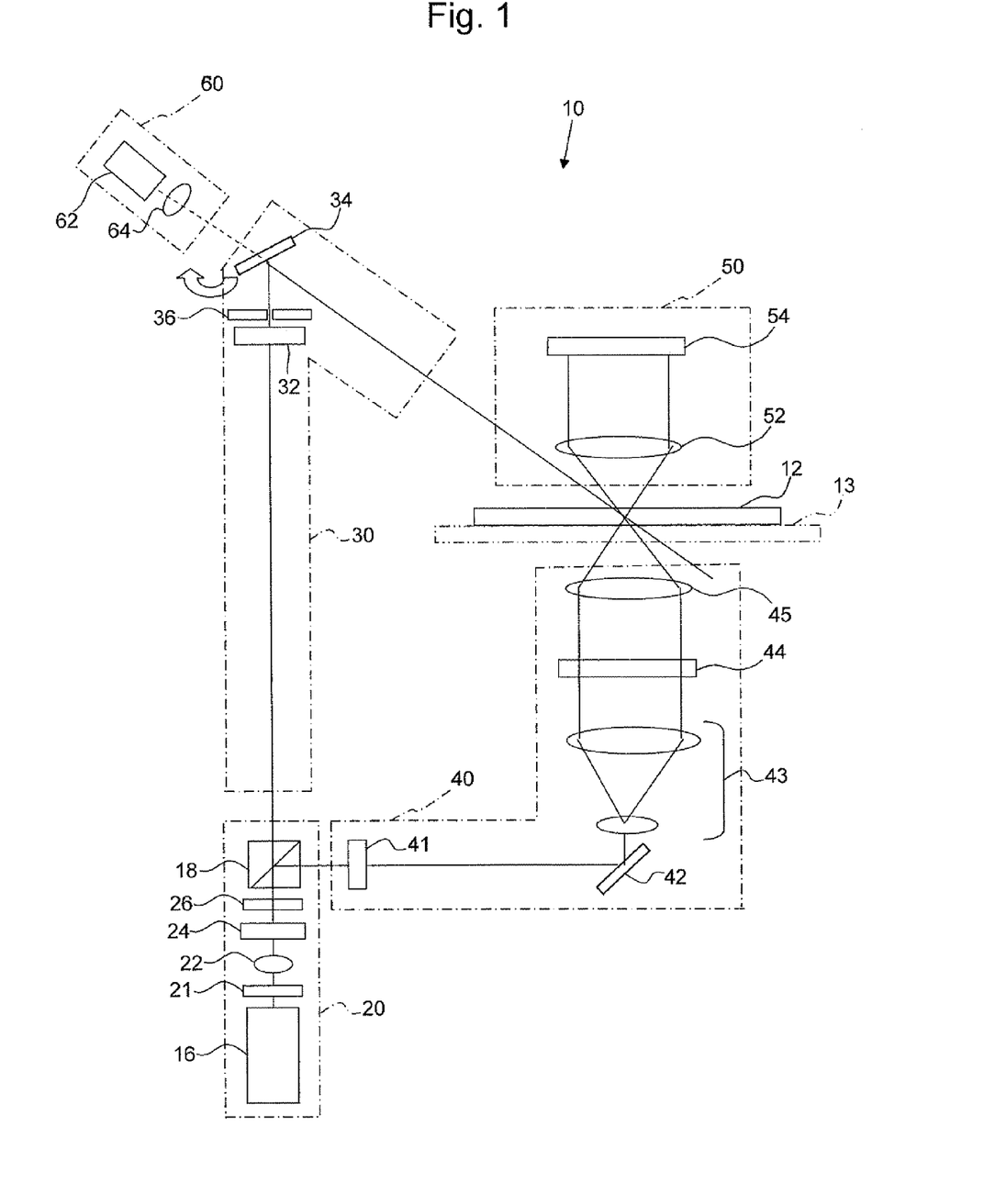
FIG. 1 is an optical system diagram illustrating an optical system in an apparatus for performing a method for determining a recording exposure for a holographic recording medium according to the present invention.
Figure 2:
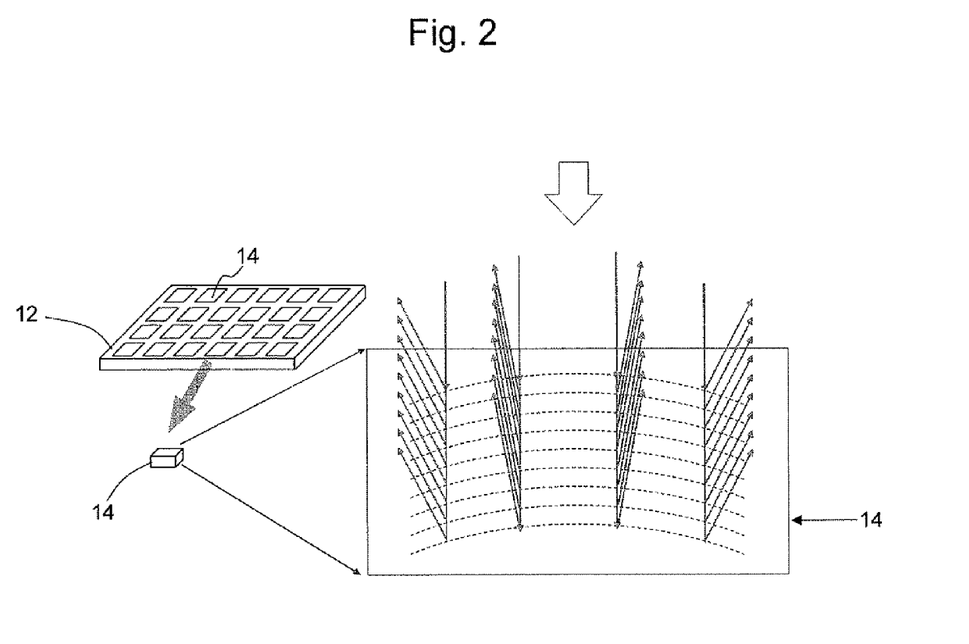
FIG. 2 is an explanatory view schematically illustrating under magnification one of elemental holograms recorded on a holographic recording medium in the apparatus.

The method for determining a recording exposure for a holographic recording medium according to an exemplary embodiment of the present invention employs a recording exposure determination optical system 10, shown in FIG. 1, for determining the amount of exposure for recording on the holographic recording medium. In the system 10, as shown in FIG. 2, a plurality of dot-shaped elemental holograms 14 are continuously recorded on a holographic recording medium 12 as follows. The amount of exposure for recording with a write laser beam is varied in first to nth stages to record a bright pattern image 25 and a dark pattern image 27 shown in FIG. 3 as first to nth bright pattern images and first to nth dark pattern images in each stage, respectively. These images are irradiated with a read beam to detect the intensity of a diffracted beam from the central portion of each bright pattern image and each dark pattern image. Then, $Sa_1/Sb_1=SNR_1, \ldots,$ and $Sa_n/Sb_n=SNR_n$ are calculated, where $Sa_1$ to $Sa_n$ are the intensity of a diffracted beam from the first to nth bright pattern images and $Sb_1$ to $Sb_n$ are the intensity of a diffracted beam from the first to nth dark pattern images. A recording exposure at $SNR_{max}$ or the maximum of the resulting $SNR_1$ to $SNR_n$ is employed as an optimal amount of exposure for recording.

[Embodiments]

As shown in FIG. 1, the recording exposure determination optical system 10 is installed in an apparatus for performing a method for determining a recording exposure for a holographic recording medium according to a first exemplary embodiment of the present invention. The system 10 is configured to include: a light source optical system 20 which includes a laser 16 to a beam splitter 18; a reference beam optical system 30 for directing a transmitted beam from the beam splitter 18 as a reference beam to the holographic recording medium 12; an object beam optical system 40 for directing a reflected beam from the beam splitter 18 as an object beam to the holographic recording medium 12 in the direction opposite to the reference beam; and a detection optical system 50 which is disposed so as to be opposed to the object beam optical system 40 with the holographic recording medium 12 therebetween.

Furthermore, the system 10 has a reading optical system 60 for supplying a read beam for reading a stereoscopic image formed on the holographic recording medium 12.

The light source optical system 20 is configured to include a shutter 21, a collimator lens 22, a half-wave plate 24, and a polarizing filter 26 in that order from the laser 16 side.

The reference beam optical system 30 is configured to include an ND filter 32, a rotatable mirror 34, and an aperture 36.

As shown in FIG. 1, the rotatable mirror 34 is configured to be rockable between a position at which a reference beam having passed through the beam splitter 18 and the ND filter 32 is reflected towards the holographic recording medium 12 and a position at which the reference beam is blocked and the read beam from the reading optical system 60 is allowed to be incident upon the holographic recording medium 12.

The object beam optical system 40 is configured to include an ND filter 41, a mirror 42, a beam expander 43, a spatial light modulator (SLM) 44, and an objective lens 45 in this order between the beam splitter 18 and the holographic recording medium 12.

The detection optical system 50 is configured to include a detection-side objective lens 52 disposed to be opposed to the objective lens 45 with the holographic recording medium 12 therebetween and a light-receiving device 54 for receiving a diffracted beam which has been collimated through the detection-side objective lens 52.

The reading optical system 60 is configured to include an LED 62 for emitting a white read beam and a collimator lens 64.

Here, the holographic recording medium 12 is mounted on an XY stage 13 to be movable in the XY-plane, and the light-receiving device 54 of the detection optical system 50 is a CCD.

Figure 3:
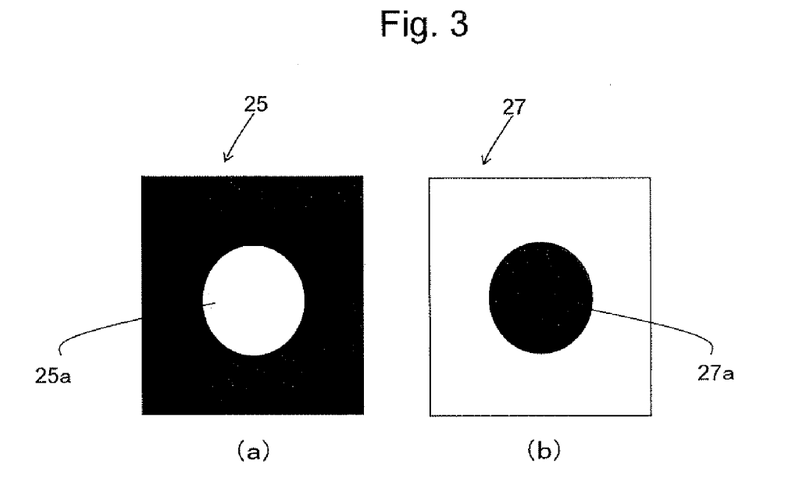
FIG. 3 is a plan view illustrating a bright pattern image and a dark pattern image which are formed with elemental holograms in the apparatus.

In this exemplary embodiment, using the SLM 44 of the recording exposure determination optical system 10 shown in FIG. 1, the elemental holograms 14 of the bright pattern image 25 and the dark pattern image 27 as shown in FIG. 3 are continuously formed and thereby stored in each area of the holographic recording medium 12.

After recording, the power of the laser 16 is shut down or the laser 16 is covered with a shield plate immediately after the emission of the laser beam. Then, the rotatable mirror 34 of the recording exposure determination optical system 10 is rotated so as to allow the read beam from the LED 62 to pass therethrough toward the holographic recording medium 12. The LED light serving as the read beam is directed to irradiate therewith the recording area of the bright pattern image 25 and the recording area of the dark pattern image 27 recorded on the holographic recording medium 12 to produce diffracted beams.

Now, a description will be made to a control system 70 shown in FIG. 4 of the recording exposure determination optical system 10.

The control system 70 is configured to include a system controller 72; an optical unit 74 which includes the shutter 21, the light-receiving device 54, the SLM 44, the half-wave plate 24, and the XY stage 13; a timing controller 76 for controlling the shutter 21, the light-receiving device 54, the half-wave plate 24, and the XY stage 13; and a laser unit 78 for controlling the laser 16.

The system controller 72 allows control software 72A to read from an image file 72B an image to be recorded and then output the image data of the resulting image from a signal processor 72C to the SLM 44.

Furthermore, the timing controller 76 is configured to control, on the basis of a command from the control software 72A, the timing at which the light-receiving device 54 receives a diffracted beam, the amount of driving the half-wave plate 24 and the timing at which the same is driven, and the timing at which the shutter 21 is opened or closed. The timing controller 76 also controls the XY stage 13 to provide control to the point of forming (the point of recording) the elemental hologram 14 on the holographic recording medium 12 on the basis of an instruction from the control software 72A.

Now, referring to FIG. 5, a description will be made to the step of recording the bright pattern image 25 and the dark pattern image 27 on the holographic recording medium 12 by the recording exposure determination optical system 10.

Figure 6:
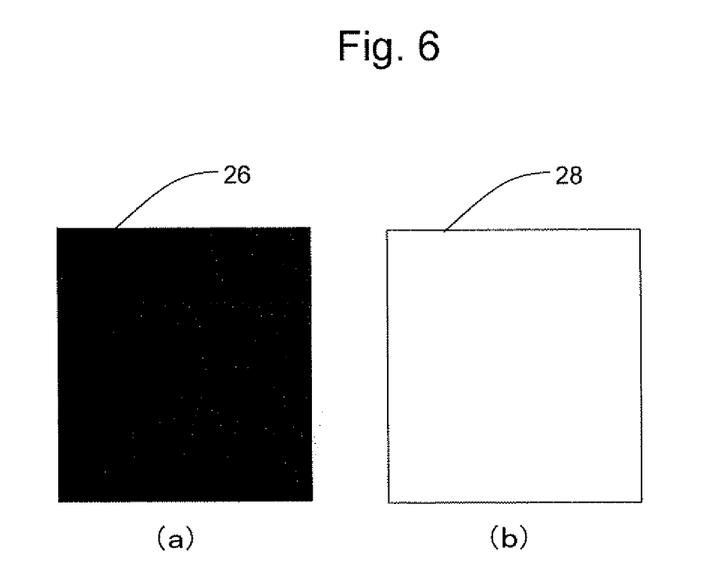
FIG. 6 is a plan view illustrating an entirely bright and an entirely dark pattern to be compared with the image patterns shown in FIG. 3.

Note that in this exemplary embodiment, for reference purposes, an entirely bright pattern image 26 and an entirely dark pattern image 28 shown in FIG. 6 are also recorded on the holographic recording medium 12.

Figure 5:
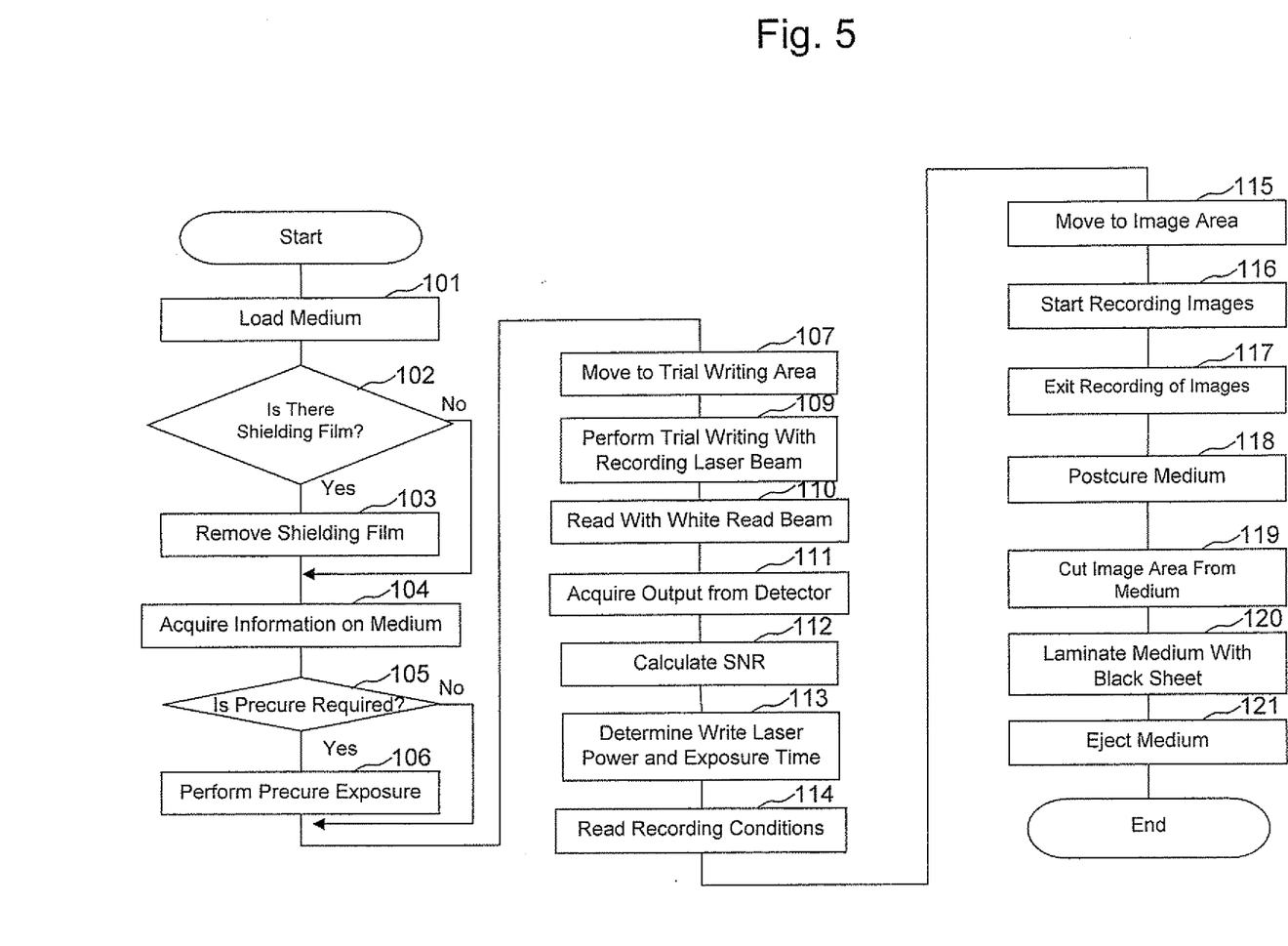
FIG. 5 is a flowchart illustrating the steps of a method for determining a recording exposure according to an exemplary embodiment of the present invention.

In step 101 of FIG. 5, the holographic recording medium 12 is loaded into the recording exposure determination optical system 10. In the next step 102, the process determines whether a light shielding film is adhered to the holographic recording medium 12. If YES, then the light shielding film is removed in the next step 103; if NO, the process skips step 103 to move to step 104.

In step 104, the process acquires information on the recording condition for recording on the holographic recording medium 12 having no light shielding film. In the next step 105, the process determines whether the holographic recording medium 12 requires a precure. If YES, then the medium is subjected to a precure exposure in step 106; if NO, then the process skips step 106 to move to step 107.

In step 107, the holographic recording medium 12 is driven by the XY stage 13 to move the trial writing area (not shown) on the holographic recording medium 12 to the intersection between the object beam and the reference beam.

In step 109, in the recording exposure determination optical system 10, the reference beam and the object beam are used to record the bright pattern image 25 and the dark pattern image 27 with the elemental hologram 14. This step will be discussed in greater detail later.

Figure 7:
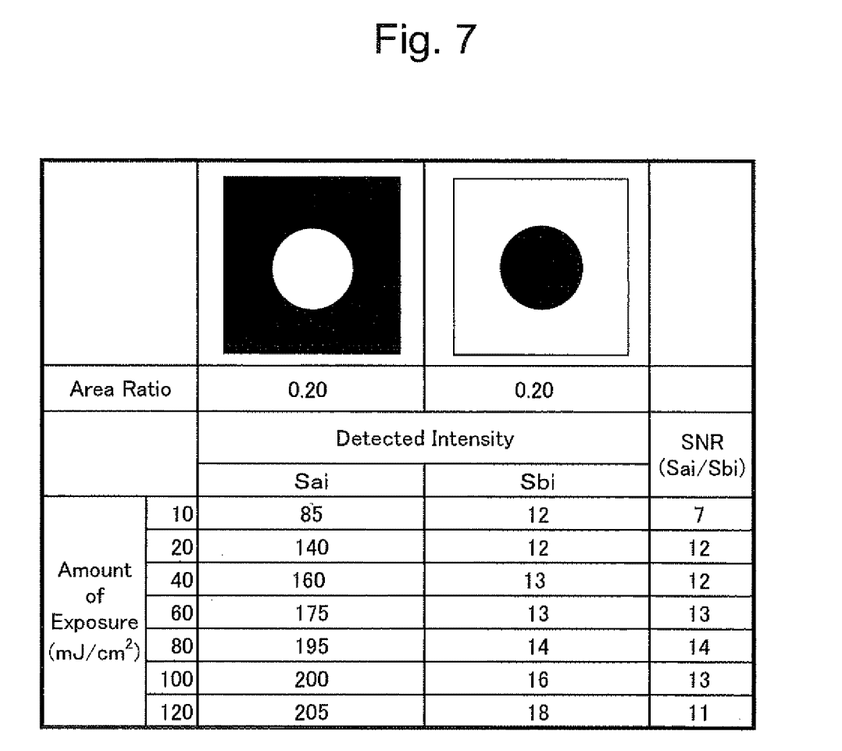
FIG. 7 is a view showing a comparison in SNR between the bright pattern image and the dark pattern image of FIG. 3 in a step of the determining method, the SNR corresponding to the recording exposure and the detected intensity of a diffracted beam during readout.
Figure 8:
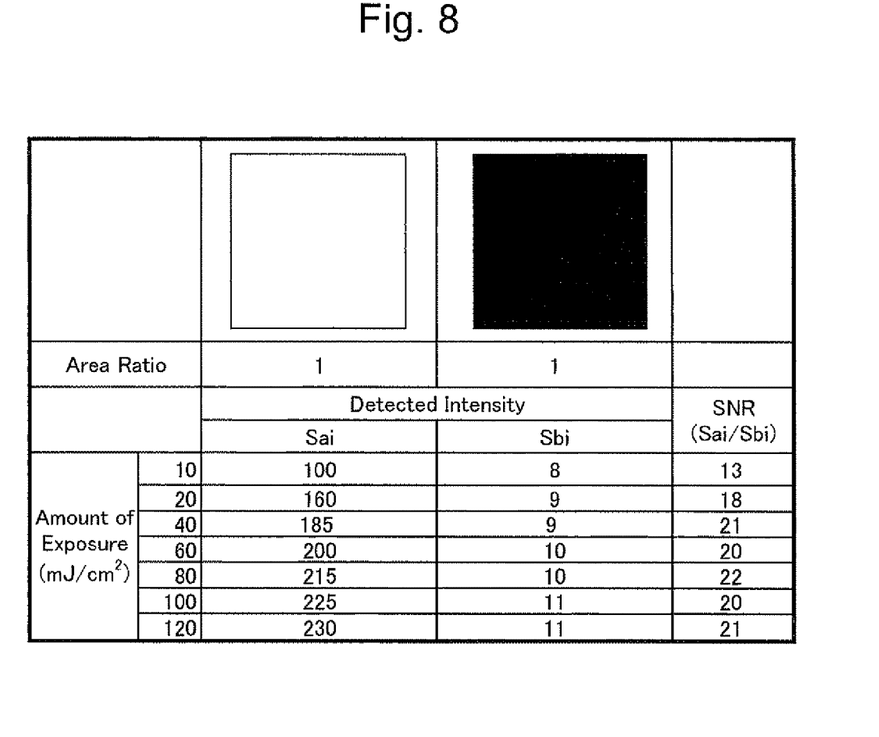
FIG. 8 is a view showing the measurement results of the diffracted beam intensity from the comparison pattern images and the SNR being provided for each recording exposure, the comparison pattern images being configured such that the bright pattern is an entirely bright pattern and the dark pattern is an entirely dark pattern.

At this time, the process provides control to one of or both the write laser power by the half-wave plate 24 and the recording time by the shutter 21, so that each pattern image is recorded with the respective recording exposure in the first to nth stages. In the next step 110, the rotatable mirror 34 shown in FIG. 1 is rocked from the status of FIG. 1 in the clockwise direction to be located so that a white read beam from the LED 62 reaches the holographic recording medium 12 without being hindered by the rotatable mirror 34. Under this condition, the read beam is used to irradiate each of the first to seventh bright pattern images, the first to seventh dark pattern images, the first to seventh entirely bright pattern images, and the first to seventh entirely dark pattern images, which have been recorded on the holographic recording medium 12 with the respective recording exposure in the first to seventh stages. The resulting diffracted beams are acquired from the light-receiving device 54 in step 111. Examples of the results are as shown in FIGS. 7 and 8.

Figure 9:
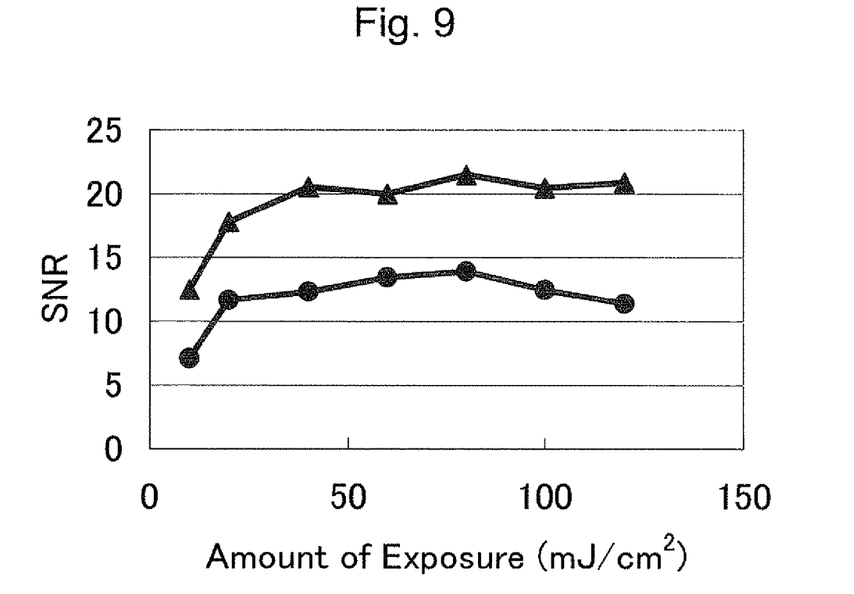
FIG. 9 is a graph showing the relations between the recording exposure and the SNR of FIGS. 7 and 8.

Furthermore, in the next step 112, the data on the diffracted beam intensities Sai and Sbi which have been detected for each recording exposure is supplied from the light-receiving device 54 through the timing controller 76 to the system controller 72, where $SNR=Sa_i/Sb_i$ is calculated for each recording exposure. As shown in FIGS. 7 and 9, it can be seen that the relation between the recording exposure and the SNR provides the highest SNR of 14 at a recording exposure of 80 mJ/cm$^2$. In steps 113, the amount of recording exposure, that is, the write laser power and the exposure time at an SNR of 14 is determined as the optimal amount of recording exposure.

In step 114, the aforementioned amount of recording exposure, i.e., the recording conditions of the write laser power and the exposure time are read into the system controller 72.

In steps 115, the XY stage 13 is used to drive the holographic recording medium 12 and move the image area thereof to a position to be Irradiated with the write laser beam so as to start recording images in step 116.

After the recording of images is ended in step 117, the holographic recording medium 12 is postcured in step 118; the image area is cut therefrom in step 119; the resulting image area is covered with a black sheet in step 120; and then in step 121, the holographic recording medium 12 is ejected from the apparatus.

Now, the steps of trial writing and reading with white light in steps 107 to 110 of FIG. 5 will be described in detail below.

An emitted beam of light from the laser 16 is collimated through the collimator lens 22, while the write laser power thereof is controlled through the half-wave plate 24 and the polarizing filter 26, and thereafter allowed into the beam splitter 18, where the beam is split into a reference beam to be transmitted and an object beam to be reflected.

The object beam is adjusted in intensity by the ND filter 41 in the object beam optical system 40; reflected on the mirror 42 and expanded in beam diameter by the beam expander 43; amplitude modulated through the SLM 44 into an object beam; and then condensed through the objective lens 45 onto the holographic recording medium 12. The SLM 44 performs modulation so that the bright pattern image 25, the dark pattern image 27, the entirely bright pattern image 26, and the entirely dark pattern image 28, shown in FIGS. 3 and 6, are formed when the elemental holograms 14 are continuously formed.

The reference beam is adjusted in intensity through the ND filter 32; then adjusted through the aperture 36 in the size and shape of the elemental hologram being recorded; reflected on the rotatable mirror 34; and allowed to enter the focal point of the object beam on the holographic recording medium 12, where the resulting reference beam is interfered with a signal beam condensed by the objective lens 45 to form an elemental hologram.

Each area of the bright pattern image 25, the dark pattern image 27, the entirely bright pattern image 26, and the entirely dark pattern image 28 recorded on the holographic recording medium 12 is irradiated with the read beam (white light) from the LED 62 in the reading optical system 60. The read beam is collimated by the collimator lens 64 and incident to generally overlap the reference beam, thereby causing the elemental hologram 14 to produce diffracted beams.

The diffracted beam is generally collimated by the detection-side objective lens 52 to be incident upon the light-receiving device 54 or a detector, where the intensity and the intensity distribution of the diffracted beams are detected.

Figure 4:
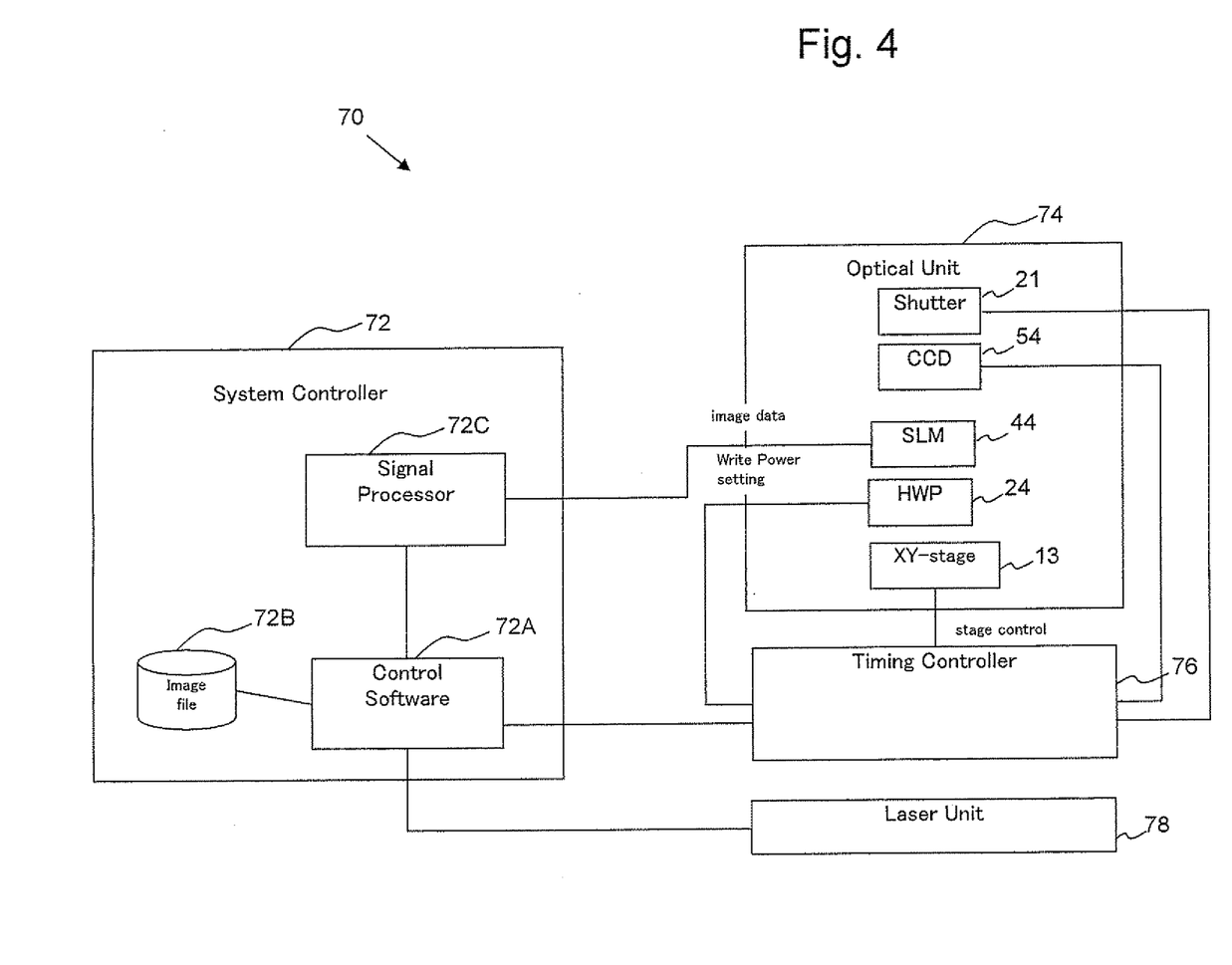
FIG. 4 is a block diagram illustrating a control system in the apparatus.

In the aforementioned exemplary embodiment, as shown in FIGS. 4 and 7, the ratio of the area of the central portion of the bright pattern image 25 and the dark pattern image 27 to the entire image is 0.20, so that the optimal amount of recording exposure of 80 mJ/cm$^2$ corresponds to this area ratio of 0.20. Thus, a different area ratio results in a variation in the optimal exposure.

Table 1 shows the optimal recording exposures which have been obtained by varying the area ratio of the central portion of the bright pattern image and the dark pattern image from 0.005 to 1 in 18 stages and by repeating steps 109 to 113 shown in FIG. 5 for each area ratio.

TABLE 1

| Area Ratio | Optimal Amount of Exposure (mJ/cm2) | Image Contrast |
|---|---|---|
| 0.005 | 10 | X |
| 0.006 | 25 | X |
| 0.007 | 40 | △ |
| 0.008 | 50 | △ |
| 0.009 | 55 | △ |
| 0.01 | 60 | ○ |
| 0.02 | 70 | ○ |
| 0.03 | 75 | ◎ |
| 0.04 | 75 | ◎ |
| 0.05 | 75 | ◎ |
| 0.1 | 75 | ◎ |
| 0.2 | 80 | ◎ |
| 0.5 | 100 | ○ |
| 0.6 | 110 | △ |
| 0.7 | 110 | △ |
| 0.8 | 115 | △ |
| 0.9 | 115 | △ |
| 1 | 120 | △ |

Furthermore, Table 1 also shows the results which are obtained by visually determining the image contrast when images are recorded at the resulting optimal recording exposure for each area ratio. From the determined results, an adequate image contrast was obtained within the range of area ratios from 0.01 to 0.5.

Figure 10:
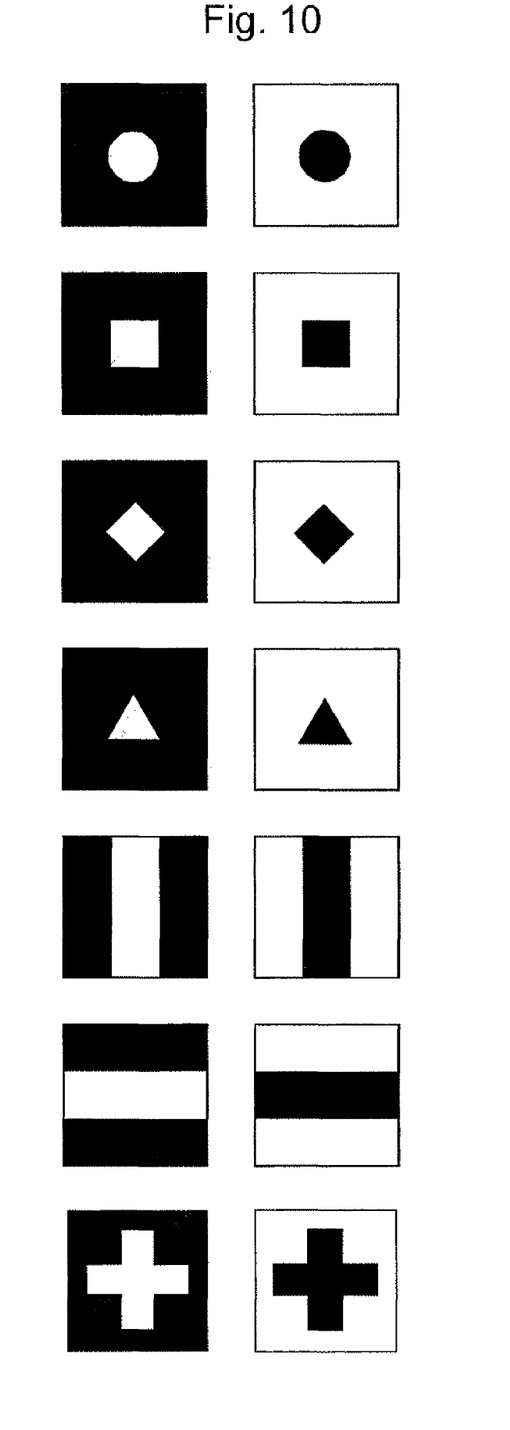
FIG. 10 is a plan view illustrating another example of a bright pattern image and a dark pattern image.

In the above exemplary embodiment, both the aforementioned bright and dark pattern images have the circular central portions 25a and 27a. Various exemplary embodiments of the invention also applicable to the bright and dark pattern images that is the pattern images with other shapes as long as the following conditions are met. That is, for the bright pattern image, the central portion should be brighter than the peripheral portion, whereas for the dark pattern image, the central portion should be brighter than the peripheral portion and contains the pattern center. Furthermore, the peripheral portion should be configured such that the four corners of the pattern are reversely bright or dark with respect to the central portion. For example, as shown in FIG. 10, the central portion may be quadrangular, rhombic, triangular, vertically elongated, horizontally elongated, or crisscross in shape.

Figure 11:
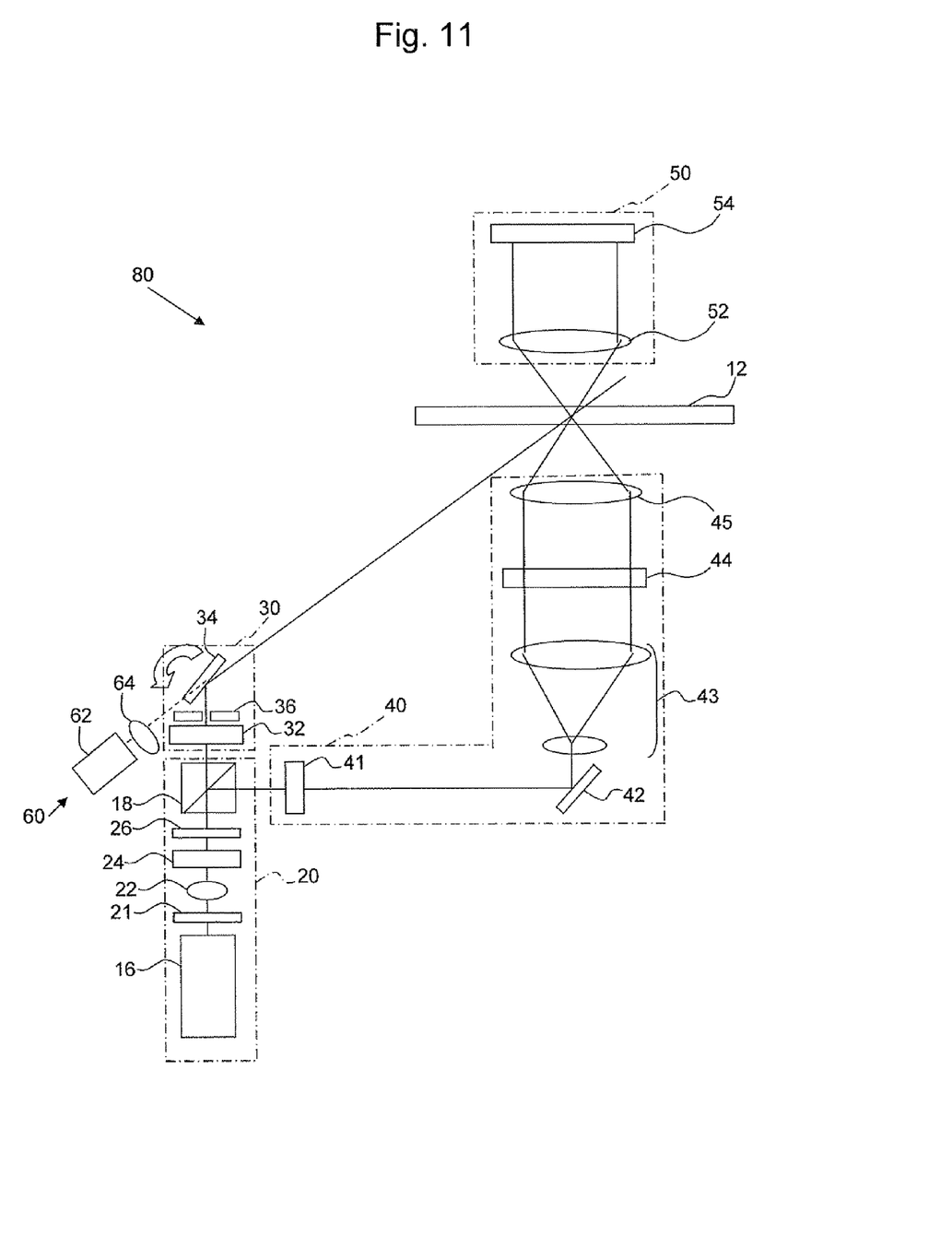
FIG. 11 is an optical system diagram illustrating an optical system in an apparatus for performing a method for determining a recording exposure to form a reflection type hologram on a holographic recording medium.

The optical system shown in FIG. 1 is of a transmitting type in which an object beam and a reference beam are incident upon the holographic recording medium in the opposite directions. However, various exemplary embodiments of the invention are also applicable to the optical system that is a recording exposure determination optical system 80 for a reflection type holographic recording medium as shown in FIG. 11. In this case, since the optical system 80 is different from the optical system of FIG. 1 only in the position of the reading optical system and the rotatable mirror, like components to those of FIG. 1 are denoted with like symbols without additional explanations.

Furthermore, the SLM 44 may be a transmission-type liquid crystal panel or a reflective device such as a digital micro mirror device (DMD) or LCOS. The light-receiving device 54 may be required only to detect the spatial optical intensity distribution such as of CCDs and CMOSs or alternatively an array of multiple simple photodetectors (PD).

Furthermore, the reading LED 62 is preferably of a white light type as in the exemplary embodiment. The white light type may be capable of reading either color images or monochrome images which are recorded on the holographic recording medium 12.

Furthermore, in the aforementioned exemplary embodiment, the trial writing on the holographic recording medium 12 is to record monochrome images. However, various exemplary embodiments of the present invention are applicable to the trial writing such that color images may also be recorded with three color laser beams, i.e., red, green, and blue. In this case, the flowchart will be such as shown in FIG. 12.

Figure 12:
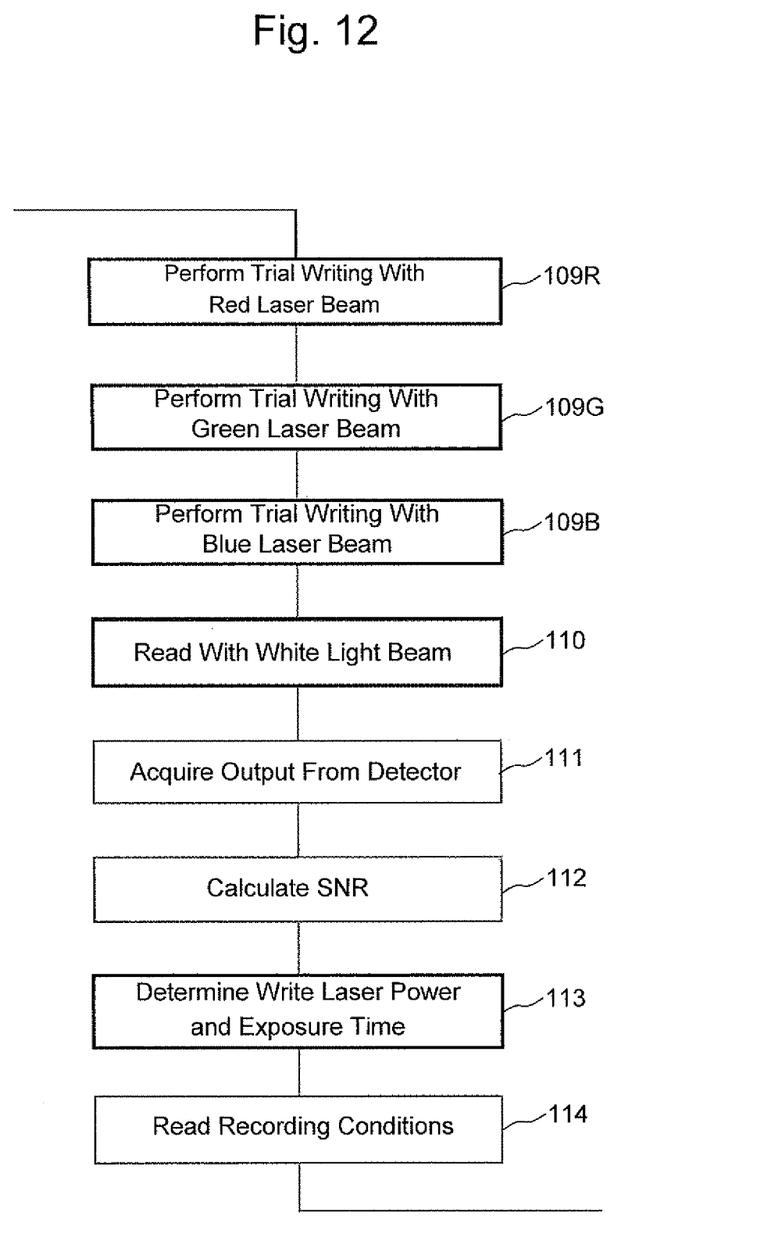
FIG. 12 is a flowchart illustrating main steps of a method for determining a recording exposure to record a color image on a holographic recording medium.

To record color images, in steps 109R, 109G, and 109B of FIG. 12, the holographic recording medium 12 is moved by the XY stage 13 for each color to record the bright pattern image 25, the dark pattern image 27, the entirely bright pattern image 26, and the entirely dark pattern image 28, which are shown in FIGS. 3 and 6, each with a red write laser beam, a green write laser beam, and a blue write laser beam. For each color, i.e., red, green, and blue, performed are the step 110 of reading with white light, the step 111 of acquiring the output from the detector, the step 112 of calculating SNRs, the step 113 of determining an optimal recording exposure, and the step 114 of reading the recording conditions. Note that the amount of recording exposure has to be determined by taking into accounts the color balance in terms of the intensity ratio between red, green, and blue. To keep the color balance, color information on the medium is preferably measured using a gonio spectral colorimetry system or the like. Measurement results may be recorded as data such as an XYZ chromaticity diagram, an L*a*b* chromaticity diagram, or an L*u*v* chromaticity diagram on part of the holographic recording medium 12 or a memory provided on the cartridge thereof. When images are recorded, this makes it possible to read the recorded data to calculate the optimal intensity at each recording wavelength, thereby determining the optimal recording conditions.

Furthermore, in the aforementioned exemplary embodiment, the optimal amount of recording exposure is determined. This may be done by fixing the recording power of the write laser beam and varying the recording time, or conversely, by fixing the recording time and varying the recording power of the write laser beam, or may also be done by varying both.

| Reference Signs List | |
|---|---|
| 10 | recording exposure determination optical system |
| 12 | holographic recording medium |
| 13 | XY stage |
| 14 | elemental hologram |
| 16 | laser |
| 18 | beam splitter |
| 22 | collimator lens |
| 25 | bright pattern image |
| 27 | dark pattern image |
| 25a, 27a | central portion |
| 30 | reference beam optical system |
| 34 | rotatable mirror |
| 40 | object beam optical system |
| 44 | spatial light modulator (SLM) |
| 45 | objective lens |
| 50 | detection optical system |
| 52 | detection-side objective lens |
| 54 | light-receiving device |
| 60 | reading optical system |
| 62 | LED |
| 64 | collimator lens |
| 70 | control system |
| 72 | system controller |
| 72A | control software |
| 72B | image file |
| 72C | signal processor |
| 74 | optical unit |
| 76 | timing controller |
| 78 | laser unit |

The invention claimed is:

1. A method for determining a recording exposure to record a plurality of elemental holograms when forming the elemental holograms on a holographic recording medium to create a three-dimensional image, the method comprising:

a bright pattern image recording step including a first bright pattern image recording substep of continuously recording a plurality of elemental holograms with a first stage recording exposure to record a first bright pattern image which is brighter at a central portion than at a peripheral portion, and second to nth bright pattern image recording substeps of recording second to nth bright pattern images having the same pattern as that of the first bright pattern image with a recording exposure varied in second to nth stages;

a dark pattern image recording step including a first dark pattern image recording substep of continuously recording a plurality of elemental holograms with the same recording exposure as that for the first stage in the first bright pattern image recording substep to record a first dark pattern image, the first dark pattern image having a central portion darker than a peripheral portion and having reversed bright and dark portions with respect to the first bright pattern image, and second to nth dark pattern image recording substeps of recording second to nth dark pattern images with the same recording exposure as that for the second to nth stages, the second to nth dark pattern images having the same pattern as that of the first dark pattern image;

a step of irradiating the first to nth bright pattern images and the first to nth dark pattern images with a read beam to detect an intensity of a diffracted beam occurring from each image;

an SNR calculating step of calculating $Sa_1/Sb_1=SNR_1$, $Sa_2/Sb_2=SNR_2, \ldots$, and $Sa_n/Sb_n=SNR_n$, where $Sa_1$ to $Sa_n$ are an intensity of a diffracted beam from the first to nth bright pattern images and $Sb_1$ to $Sb_n$ are an intensity of a diffracted beam from the first to nth dark pattern images;

an $SNR_{max}$ determining step of determining an $SNR_{max}$ being the maximum of the resulting $SNR_1, SNR_2, \ldots$, and $SNR_n$; and a step of determining a recording exposure at the $SNR_{max}$ as an optimal recording exposure among the recording exposures in the first to nth stages.

2. The method for determining a recording exposure for a holographic recording medium according to claim 1, wherein an image area in the central portion in the first to nth bright pattern images and the first to nth dark pattern images is 0.01 to 0.5 times an entire pattern area.

3. A method for recording on a holographic recording medium wherein a write laser beam with an optimal recording exposure is used to record a stereoscopic image on a holographic recording medium, the optimal recording exposure being determined according to claim 2.

4. The method for determining a recording exposure for a holographic recording medium according to claim 1, wherein a trial writing area is set on the holographic recording medium in addition to an image area for recording images so as to record the first to nth bright pattern images and the first to nth dark pattern images on the trial writing area.

5. A method for recording on a holographic recording medium wherein a write laser beam with an optimal recording exposure is used to record a stereoscopic image on a holographic recording medium, the optimal recording exposure being determined according to claim 4.

6. The method for determining a recording exposure for a holographic recording medium according to claim 1, wherein the holographic recording medium is a three-color image recording medium, the colors including red, green, and blue, and the bright pattern image recording step and the dark pattern image recording step include a substep of recording a red bright pattern image and a substep of recording a red dark pattern image using a red write laser beam; a substep of recording a green color bright pattern image and a substep of recording a green color dark pattern image using a green write laser beam; and a substep of recording a blue dark pattern image and a substep of recording a blue bright pattern image using a blue write laser beam, and a recording exposure is determined for each of the colors, i.e., red, green, and blue.

7. A method for recording on a holographic recording medium wherein a write laser beam with an optimal recording exposure is used to record a stereoscopic image on a holographic recording medium, the optimal recording exposure being determined according to claim 6.

8. The method for determining a recording exposure for a holographic recording medium according to claim 1, wherein a dark portion and a bright portion of the bright pattern image and the dark pattern image are formed from an entirely dark pixel and an entirely bright pixel of a spatial light modulator, respectively.

9. A method for recording on a holographic recording medium wherein a write laser beam with an optimal recording exposure is used to record a stereoscopic image on a holographic recording medium, the optimal recording exposure being determined according to claim 8.

10. A method for recording on a holographic recording medium wherein a write laser beam with an optimal recording exposure is used to record a stereoscopic image on a holographic recording medium, the optimal recording exposure being determined according to claim 1.

\* \* \* \* \*